(12) United States Patent
Chang (10) Patent No.: US 7,986,523 B2
(45) Date of Patent: Jul. 26, 2011

(54) DISPLAY DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 636 days.

(21) Appl. No.: 12/135,838

(22) Filed: Jun. 9, 2008

(65) Prior Publication Data

US 2008/0309679 A1 Dec. 18, 2008

(30) Foreign Application Priority Data

Jun. 15, 2007 (CN) .......................... 2007 1 0200827

(51) Int. Cl.
*G06F 1/16* (2006.01)
*H05K 5/00* (2006.01)
*H05K 7/00* (2006.01)

(52) U.S. Cl. .............................. 361/679.55; 361/679.02

(58) Field of Classification Search ............ 361/679.01, 361/679.02, 679.06, 679.21, 679.26, 679.3, 361/679.55, 679.56; 455/575.1–575.4, 575.8
See application file for complete search history.

(56) References Cited

U.S. PATENT DOCUMENTS

| 4,969,647 | A | | 11/1990 | Mical et al. | |
|---|---|---|---|---|---|
| 6,658,272 | B1 | * | 12/2003 | Lenchik et al. | 455/575.1 |
| 6,882,335 | B2 | * | 4/2005 | Saarinen | 345/156 |
| 2004/0067783 | A1 | * | 4/2004 | Lenchik et al. | 455/575.1 |
| 2004/0203485 | A1 | * | 10/2004 | Lenchik et al. | 455/90.1 |
| 2005/0020325 | A1 | * | 1/2005 | Enger et al. | 455/575.3 |
| 2005/0070347 | A1 | * | 3/2005 | Ogura | 455/575.1 |
| 2005/0215297 | A1 | * | 9/2005 | Aoki | 455/575.3 |
| 2009/0027420 | A1 | * | 1/2009 | Chang | 345/652 |

FOREIGN PATENT DOCUMENTS

CN 1581286 A 2/2005

* cited by examiner

*Primary Examiner* — Jayprakash N Gandhi
*Assistant Examiner* — Adrian S Wilson
(74) *Attorney, Agent, or Firm* — Andrew C. Cheng (57) ABSTRACT

A display device includes a main body, a display screen, an orientation sensing module and a display controlling module. The display screen is arranged on the main body for displaying an image in an original orientation. The orientation sensing module includes a first elongated chamber, a first capacitor, a second capacitor and a flowing medium received in the first elongated chamber. The display controlling module is configured for deviating the displayed image at a given angle clockwise or counterclockwise from the first orientation of the image in response to the change of the capacitance of the first capacitor or the second capacitor.

9 Claims, 10 Drawing Sheets

DISPLAY DEVICE

BACKGROUND

1. Technical Field

The present invention generally relates to display devices, and particularly, to a display device having a capability of deviating orientation of displayed image by sensing orientation of the display device.

2. Description of Related Art

Figure 10:
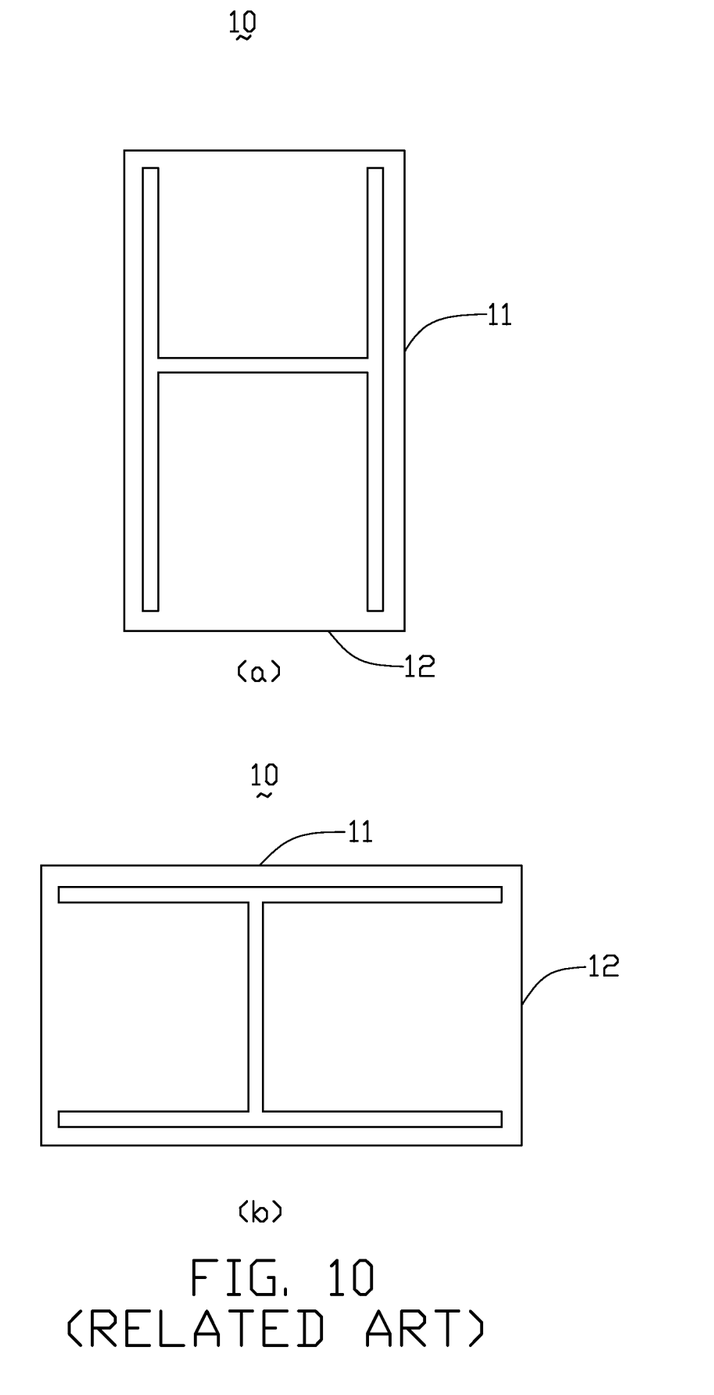
FIG. 10(a) is a view of a typical display screen in an upright orientation.
FIG. 10(b) is a view of a typical display screen turned over on its long sides.

Referring to FIG. 10(a), a typical display screen 10 is provided. The display screen 10 is rectangular, and has two long sides 11 and two short sides 12. An image such as an "H" will no longer appear upright if the display screen 10 should be turned over on its long sides 11 (FIG. 10b).

Therefore, what is needed is a display device, which can adjust orientation of an image displayed therein to correspond with changing orientation of the display device.

SUMMARY

A display device, in accordance with a present embodiment, is provided. The display device includes a main body and a display screen arranged on the main body for displaying an image in an original orientation. Also included are an orientation sensing module and a display controlling module. The orientation sensing module includes a first elongated chamber, a first capacitor, a second capacitor and a flowing medium received in the first elongated chamber. The first elongated chamber has a first portion and a second portion. The first capacitor comprises two metallic pieces arranged at opposite sides of the first portion of the first elongated chamber. The second capacitor comprises two metallic pieces arranged at opposite sides of the second portion of the first elongated chamber. The flowing medium is flowable through the first portion or the second portion of the first elongated chamber due to gravitational force acting thereupon, thereby causing a change of the capacitance of the first capacitor or the second capacitor. The display controlling module is configured for deviating the displayed image at a given angle clockwise or counterclockwise from the original orientation of the image in response to the change of the capacitance of the first capacitor or the second capacitor.

Other advantages and novel features will become more apparent from the following detailed description of embodiments, when taken in conjunction with the accompanying drawings.

BRIEF DESCRIPTION OF THE DRAWINGS

Many aspects of the present display device can be better understood with reference to the following drawings. The components in the drawings are not necessarily drawn to scale, the emphasis instead being placed upon clearly illustrating the principles of the present display device. Moreover, in the drawings, like reference numerals designate corresponding parts throughout the several views.

The exemplifications set out herein illustrate various preferred embodiments, in various forms, and such exemplifications are not to be construed as limiting the scope of the present display device in any manner.

DETAILED DESCRIPTION

Figure 1:
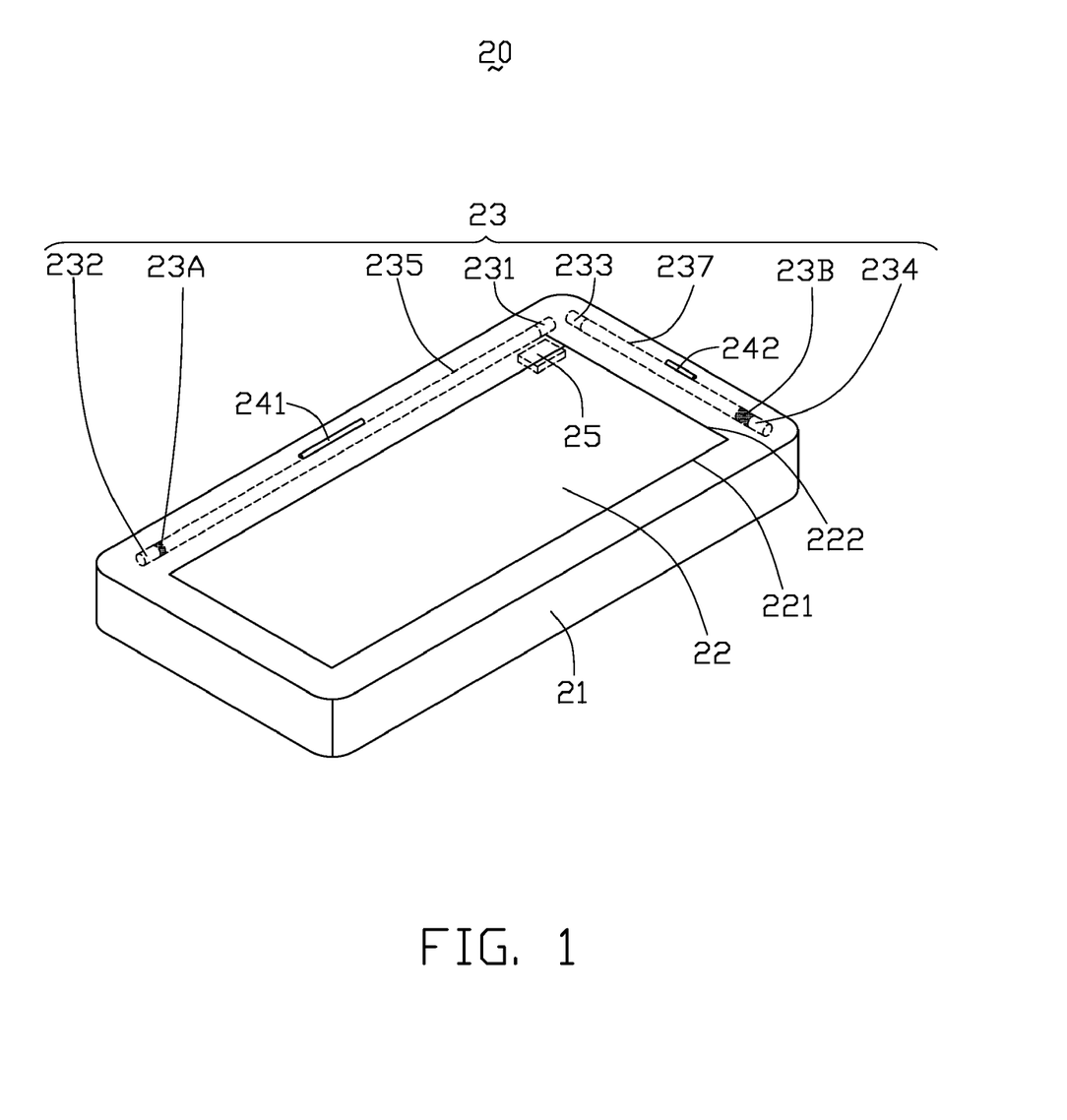
FIG. 1 is a principal structural view of the display device, in accordance with a first embodiment.

Referring to FIG. 1, a display device 20 in accordance with a first exemplary embodiment, is provided. The display device 20 includes a main body 21, a rectangle display screen 22, a orientation sensing module 23 and a display controlling module 25.

The display screen 22 (generally also defined as display panel) is arranged on the main body 21 and includes two long sides 221 and two short sides 222 with a ratio of 4:3 for displaying an image.

Figure 2:
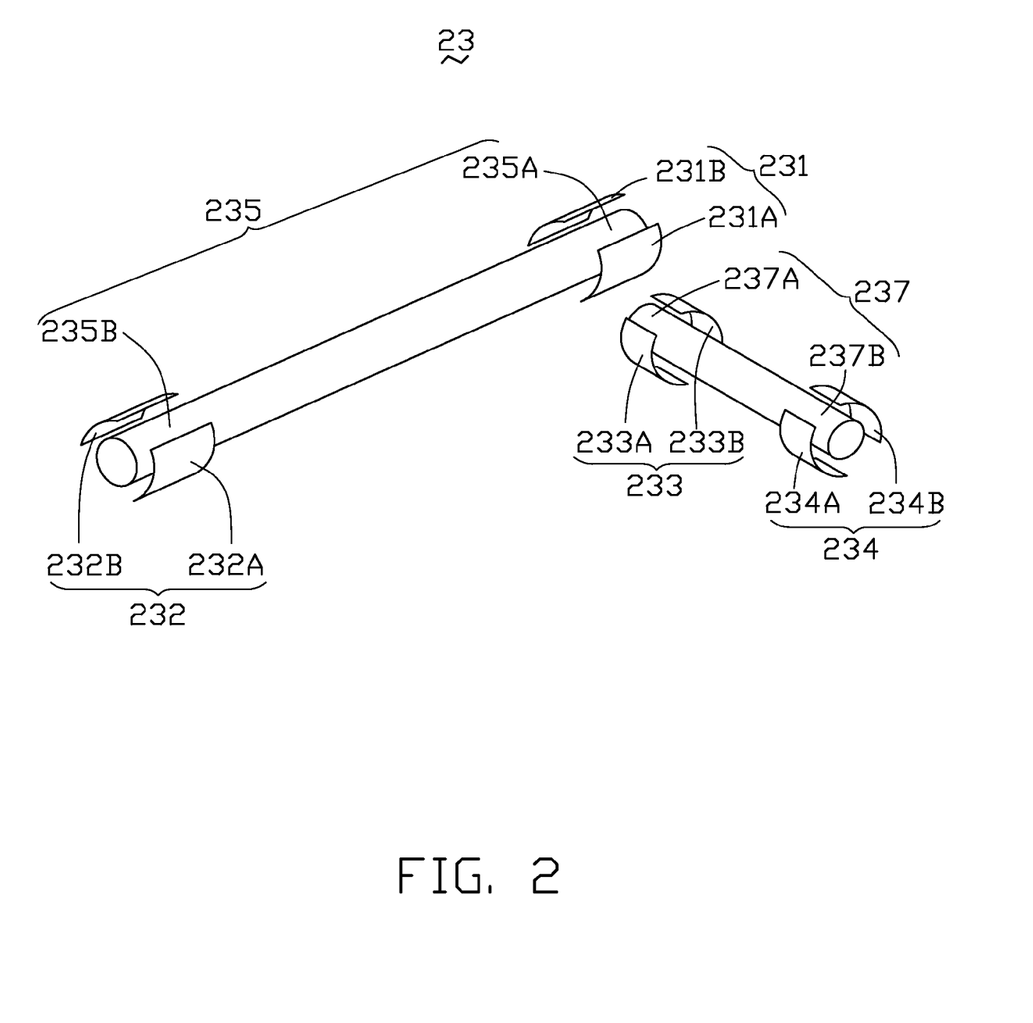
FIG. 2 is an exploded view of an orientation module in the display device of FIG. 1.

As shown in FIGS. 1 and 2, the orientation sensing module 23 includes a first capacitor 231, a second capacitor 232, a third capacitor 233, a fourth capacitor 234, a first elongated chamber 235 and a second elongated chamber 237. The first elongated chamber 235 includes a first portion 235A and a second portion 235B. The first capacitor 231 includes two metallic pieces 231A, 231B arranged at opposite sides of the first portion 235A of the first elongated chamber 235. The second capacitor 232 includes two metallic pieces 232A, 232B arranged at opposite sides of the second portion 235B of the first elongated chamber 235. A flowing medium 23A is received in the first elongated chamber 235, the flowing medium 23A is flowable through the first portion 235A or the second portion 235B of the first elongated chamber 235. Similarly, the second elongated chamber 237 includes a first portion 237A and a second portion 237B. The third capacitor 233 includes two metallic pieces 233A, 233B arranged at opposite sides of the first portion 237A of the second elongated chamber 237. The fourth capacitor 234 includes two metallic pieces 234A, 234B arranged at opposite sides of the second portion 237B of the second elongated chamber 237. A flowing medium 23B is received in the second elongated chamber 237, the flowing medium 23B is flowable through the first portion 237A or the second portion 237B of the second elongated chamber 237. A power supply (not label) is used with two electrodes thereof electrically connected to the first, second, third and fourth capacitors 231, 232, 233 and 234 respectively. The flowing medium 23A and 23B can be water or other liquid with dielectric constant thereof greater than atmosphere.

The first elongated chamber 235 is arranged on the main body 21 parallel to the long sides 221 of the display screen 22. The second elongated chamber 237 is arranged on the main body 21 parallel to the short sides 222 of the display screen 22.

Figure 3:
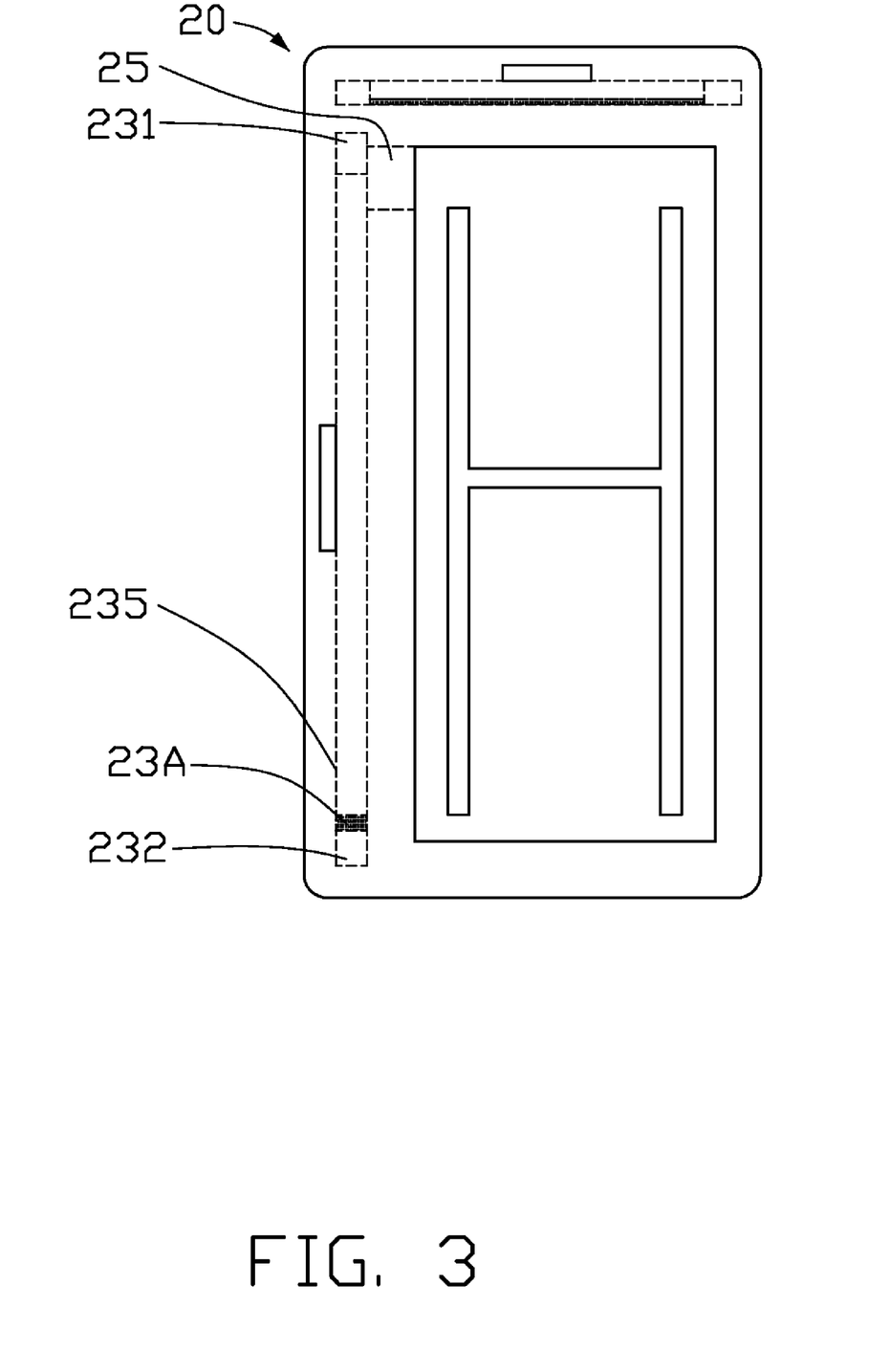
FIG. 3 is a view of the display device of FIG. 1 in a first orientation showing an image in a similar orientation.

As shown in FIG. 3, the display device 20 is in a first orientation, the first elongated chamber 235 is perpendicular to the ground with the first capacitor 231 higher than the second capacitor 232. The first flowing medium 23A received in the first elongated chamber 235 is flowable through the second portion 235B of the first elongated chamber 235 due to gravitational force acting thereupon, the volume of the first flowing medium 23A located between the metallic pieces 232A, 232B is at its peak value, thus, the capacitance of the second capacitor 232 reaches a predetermined value, a signal is sent from the second capacitor 232 to the display controlling module 25. As a result, the image such as an "H" is controlled by the display controlling module 25 to be displayed in an upright orientation.

Figure 4:
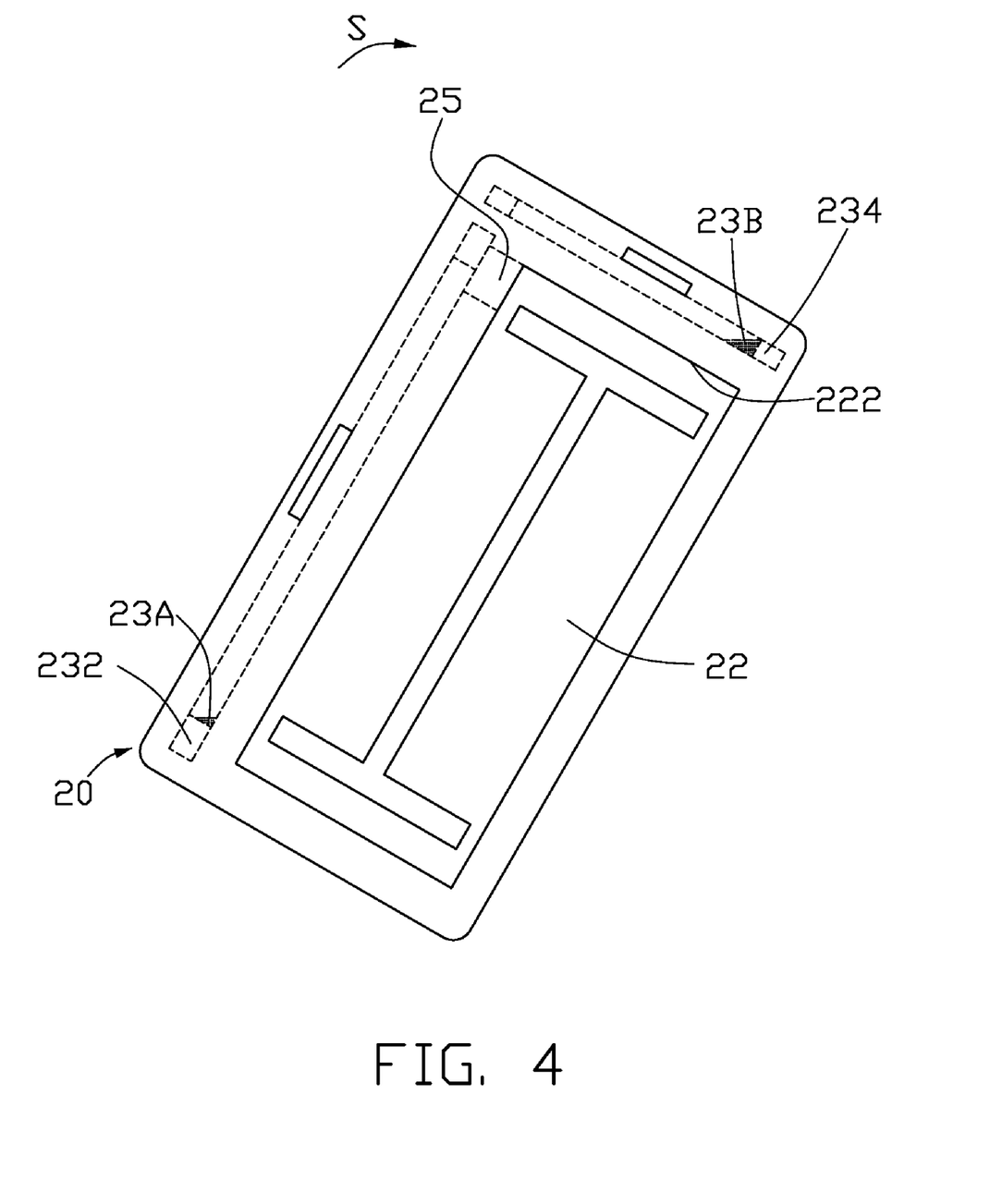
FIG. 4 is a schematic view of the display device of FIG. 1 during rotation to a second orientation showing the image adjusting correspondingly.
Figure 5:
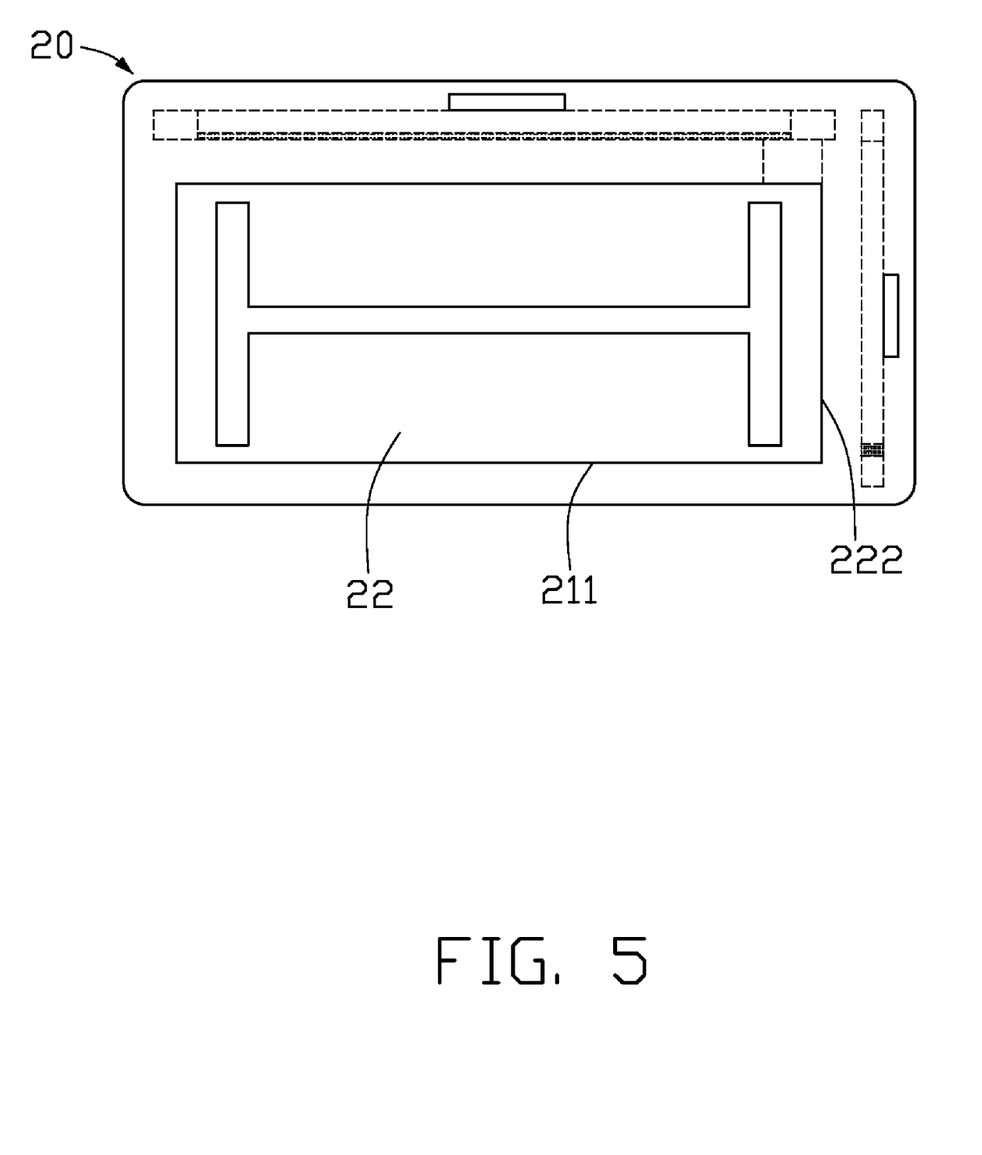
FIG. 5 is a view of the display device of FIG. 1 in the second orientation.

Referring to FIGS. 4 and 5, the display device 20 is rotated clockwise (the rotating direction is shown by the arrowhead S in FIG. 4) 90 degrees from the first orientation to a second orientation, as shown in FIG. 5. During rotation, the volume of the first flowing medium 23A located between the metallic pieces 232A, 232B and the capacitance of the second capacitor 232 decreases, and the volume of the second flowing medium 23B located between the metallic pieces 234A, 234B and the capacitance of the fourth capacitor 234 increases. While the capacitance of the second capacitor 232 is less than the predetermined value and the capacitance of the fourth capacitor 234 has reached a predetermined value, just the fourth capacitor 234 sends a signal to the display controlling module 25, and the lateral sides of the image are adjusted to be displayed parallel to the short side 222 of the display screen 22. Once the display device 20 is in a second orientation (on it's long sides 221), the image is adjusted to appear upright.

Figure 6:
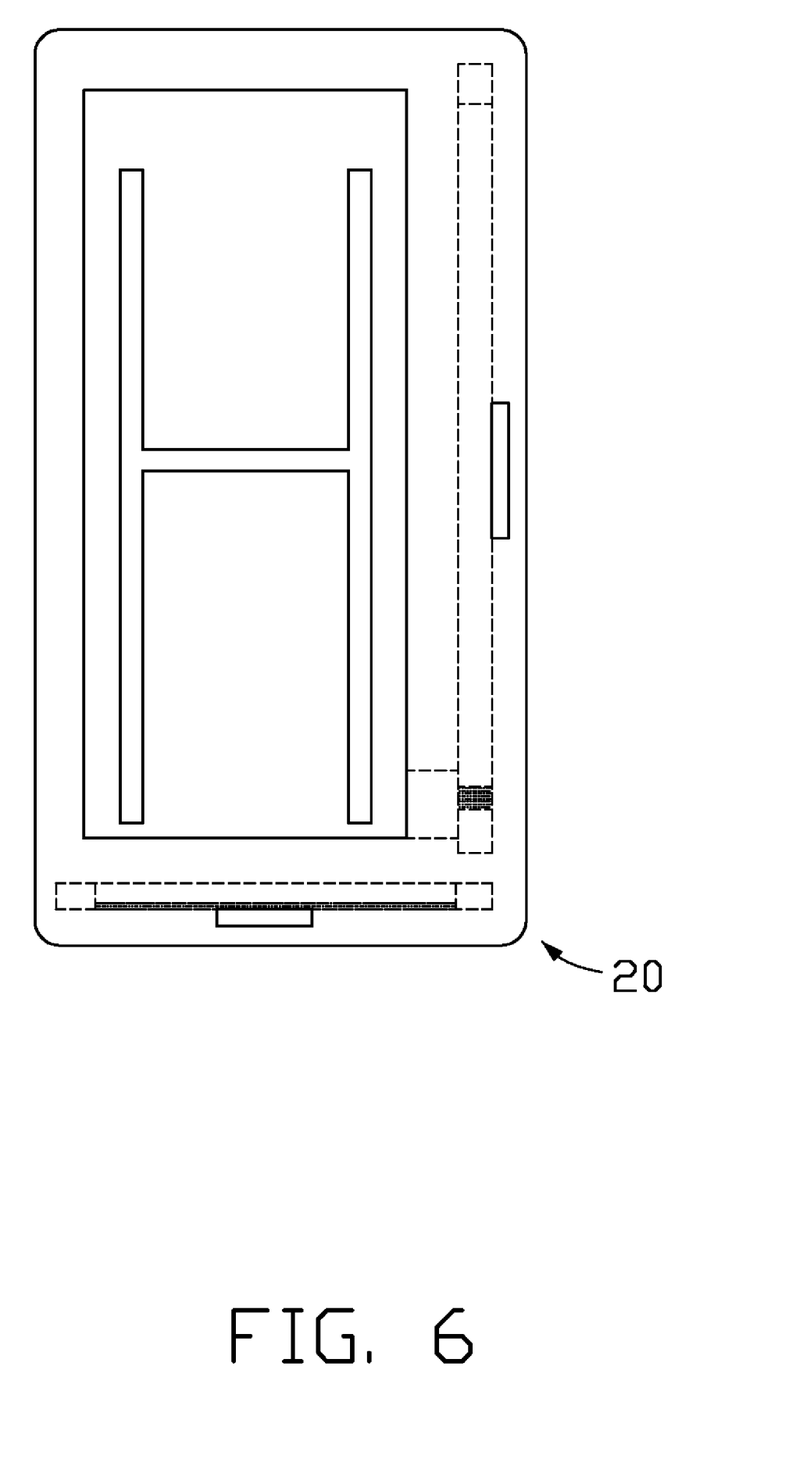
FIG. 6 is a view of the display device of FIG. 1 rotated 180 degrees from the first orientation to a third orientation and the image adjusted to appear upright.

Even if the display device 20 is rotated a full 180 degrees (as shown in FIG. 6) clockwise to an upside down position (third orientation), the image is adjusted to appear upright.

It should be noted, that the first and second elongated chambers 235, 237 can made of materials chosen according to their hydrophobic or other attributes depending on desired level of freedom for the flowing medium to flow therein.

The display device 20 can further include an indicator, such as a first light emitting diode 241 and a second light emitting diode 242 arranged on the main body 21 for indicating orientation of the image. For example, the first light emitting diode 241 and the second light emitting diode 242 are electrically connected to the display controlling module 25. As the image is displayed with lateral sides thereof parallel to the long sides 221 of the display screen 22, the first light emitting diode 241 is turned on; and as the image is displayed with lateral sides thereof parallel to the short sides 222 of the display screen 22, the second light emitting diode 242 is turned on.

It should be noted that the display device 20 is not limited to have the above-mentioned first embodiment, the display device described in below embodiments, are acceptable as well.

Figure 7:
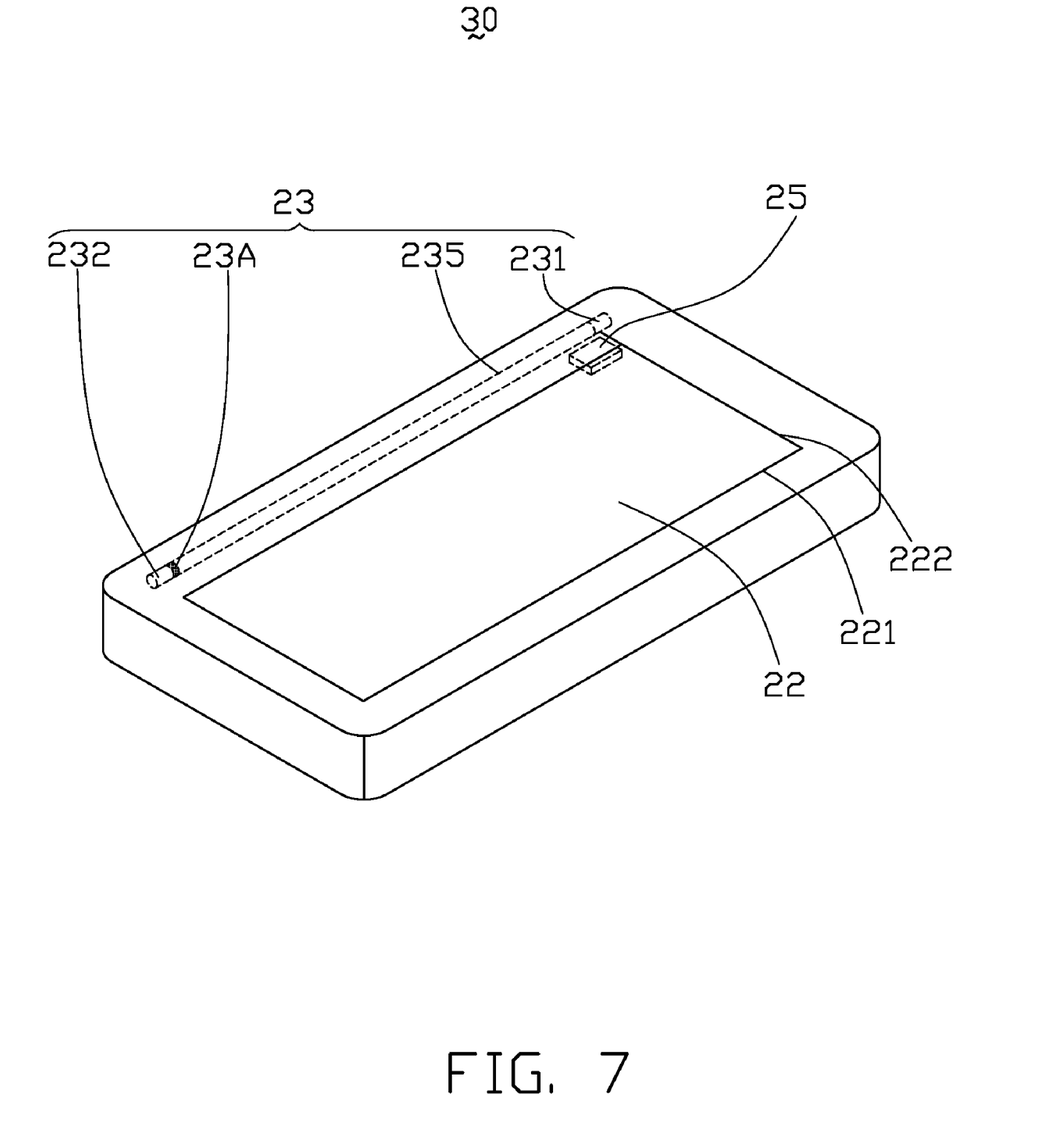
FIG. 7 is a principal structural view of the display device, in accordance with a second embodiment.

FIG. 7 shows a display device 30, in accordance with the second embodiment. The display device 30 is distinguished from the display device 20 in that an orientation sensing module 23 includes only two capacitors (first capacitor 231 and second capacitor 232).

Figure 8:
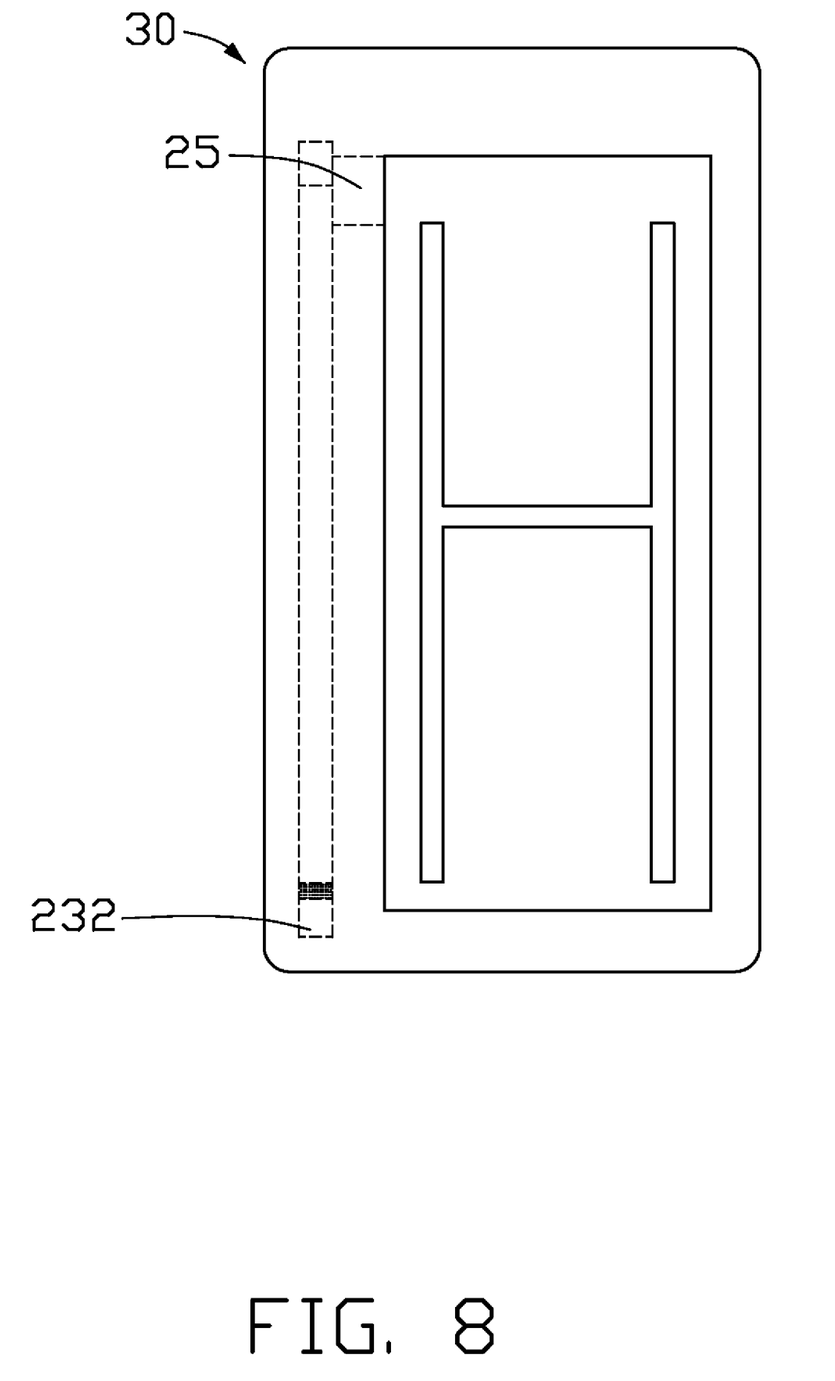
FIG. 8 is a view of the display device of FIG. 7 in a first orientation showing an image in a similar orientation.
Figure 9:
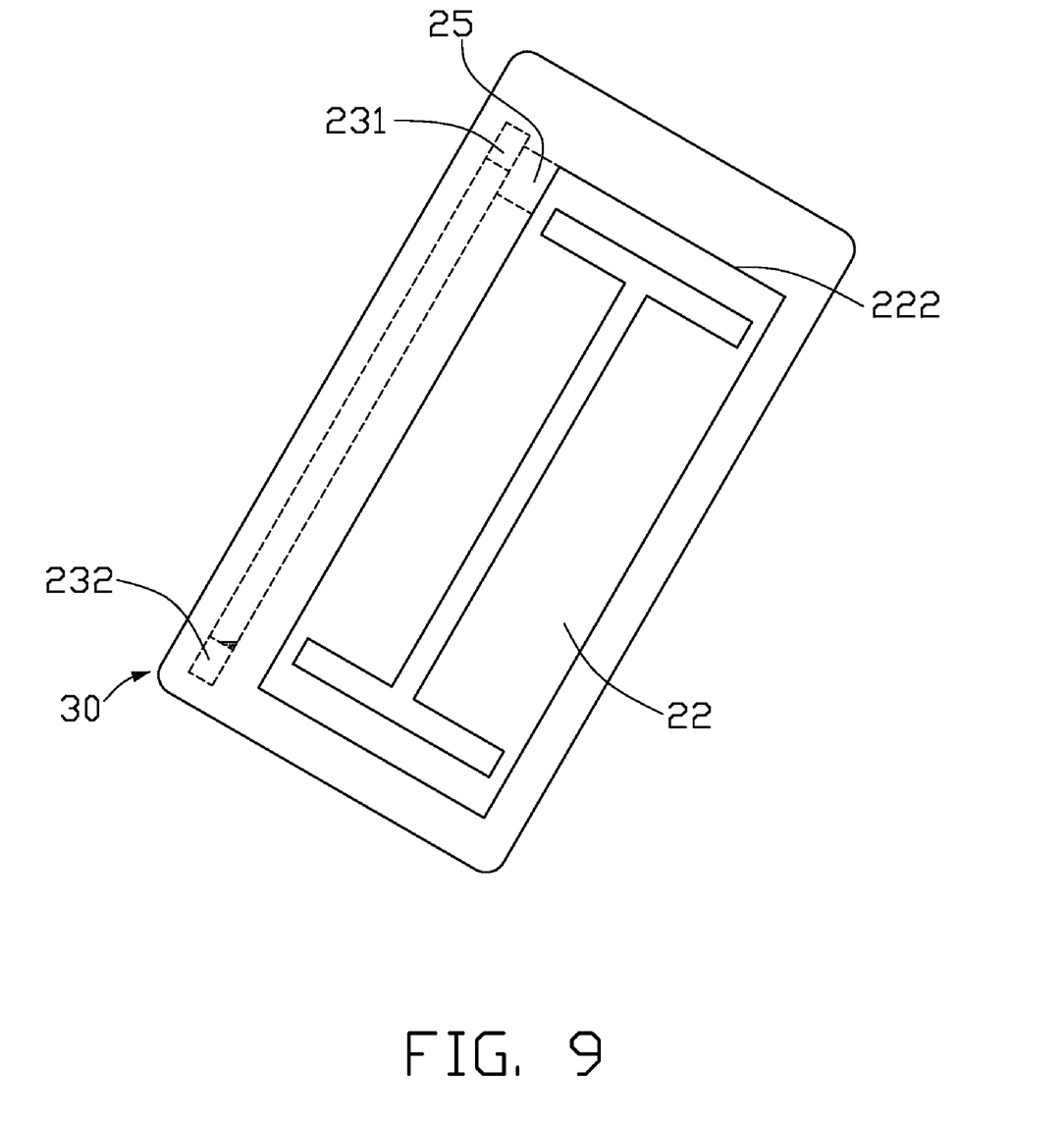
FIG. 9 is a schematic view of the display device of FIG. 7 during rotation to a second orientation showing the image adjusted correspondingly.

Referring to FIGS. 8 and 9. In operation, as the capacitance of first or second capacitor 231, 232 reaches a predetermined value, an image is displayed with lateral sides thereof parallel to the long side 221, or parallel to the short side 222. As shown in FIG. 8, the display device 30 is in a first orientation, the capacitance of the second capacitor 232 reaches a predetermined value, a signal is sent from second capacitor 232 to the display controlling module 25, an image such as an "H" is displayed upright. Furthermore, as shown in FIG. 9, the display device 30 is during rotation to a second orientation, the capacitance of the first and second capacitor 231, 232 can not reach a predetermine value synchronously. As a result, the display controlling module 25 controls to change the orientation of the image, the image is displayed with lateral sides thereof parallel to the second side 222 of the display screen 22.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A display device comprising:
   a main body;
   a display screen arranged on the main body for displaying an image in a original orientation;
   an orientation sensing module including
      a first elongated chamber having a first portion and a second portion,
         a first capacitor comprising two metallic pieces arranged at opposite sides of the first portion of the first elongated chamber, and
         a second capacitor comprising two metallic pieces arranged at opposite sides of the second portion of the first elongated chamber,
      a flowing medium received in the first elongated chamber, the flowing medium being flowable through the first portion or the second portion of the first elongated chamber due to gravitational force acting thereupon, thereby causing a change in the capacitance of the first capacitor or the second capacitor;
   a display controlling module for deviating the displayed image at a given angle clockwise or counterclockwise from the original orientation of the image in response to the change in the capacitance of the first capacitor or the second capacitor.

2. The display device of claim 1, wherein the display screen is rectangular and includes two long sides and two short sides, the first elongated chamber being parallel to the long sides.

3. The display device of claim 2, wherein the first and second capacitors are located at opposite ends of the first elongated chamber.

4. The display device of claim 1, further comprising a second elongated chamber having a first portion and a second portion, a third capacitor comprising two metallic pieces arranged at opposite sides of the first portion of the second elongated chamber, and a fourth capacitor comprising two metallic pieces arranged at opposite sides of the second portion of the second elongated chamber, and a flowing medium received in the second elongated chamber, the flowing medium being flowable through the first portion or the second portion of the second elongated chamber due to gravitational force acting thereupon, thereby causing a change in the capacitance of the third capacitor or the fourth capacitor, and the display controlling module is configured for deviating the displayed image at a given angle clockwise or counterclockwise from original orientation of the image in response to the change in the capacitance of the third capacitor or the fourth capacitor.

5. The display device of claim 1, further comprising an indicator arranged on the main body for indicating the orientation of the image.

6. The display device of claim 5, wherein the indicator comprising two light emitting diodes.

7. A display device comprising:
a main body;
a display screen arranged on the main body for displaying an image in an original orientation;
an orientation sensing module including
a first elongated chamber having a first portion and a second portion,
   a first capacitor comprising two metallic pieces arranged at opposite sides of the first portion of the first elongated chamber, and
   a second capacitor comprising two metallic pieces arranged at opposite sides of the second portion of the first elongated chamber,
   a flowing medium received in the first elongated chamber, the flowing medium being flowable through the first portion or the second portion of the first elongated chamber due to gravitational force acting thereupon, thereby causing a change in the capacitance of the first capacitor or the second capacitor,
a second elongated chamber having a first portion and a second portion,
   a third capacitor comprising two metallic pieces arranged at opposite sides of the first portion of the second elongated chamber,
   a fourth capacitor comprising two metallic pieces arranged at opposite sides of the second portion of the second elongated chamber, and
   a flowing medium received in the second elongated chamber, the flowing medium being flowable through the first portion or the second portion of the second elongated chamber due to gravitational force acting thereupon, thereby causing a change in the capacitance of the third capacitor or the fourth capacitor;
a display controlling module for deviating the displayed image at a given angle clockwise or counterclockwise from original orientation of the image in response to the change in the capacitance of the at least one of the first, second, third and the fourth capacitor.

8. The display device of claim 7, wherein the first elongated chamber is substantially perpendicular to the second elongated chamber.

9. The display device of claim 8, wherein the display controlling module is configured for deviating the displayed image at 90 degrees clockwise or counterclockwise from original orientation of the image in response to the change in the capacitance of the at least one of the first, second, third and the fourth capacitor.

* * * * *